United States Patent [19]

Tanaka

[11] 4,143,162

[45] Mar. 6, 1979

[54] ENCAPSULATED FOODSTUFF

[76] Inventor: Yoshiho Tanaka, 40 Banchi, Mitono-cho, Gifu-shi, Gifu-ken, Japan

[21] Appl. No.: 723,299

[22] Filed: Sep. 14, 1976

[30] Foreign Application Priority Data

Sep. 13, 1975 [JP] Japan ................. 50-110485

[51] Int. Cl.² ............................................. A23L 1/221
[52] U.S. Cl. ..................................... 426/89; 426/533; 426/601; 426/638; 426/651
[58] Field of Search ................. 426/89, 96, 98, 99, 426/138, 533, 575, 601, 638, 648, 650, 651, 97, 103; 424/364

[56] References Cited

U.S. PATENT DOCUMENTS

| | | | |
|---|---|---|---|
| 1,056,649 | 3/1913 | Ellis | 426/638 |
| 3,939,284 | 2/1976 | Akin et al. | 426/648 |
| 3,949,094 | 4/1976 | Johnson et al. | 426/99 |
| 3,962,466 | 6/1976 | Nakabayashi | 426/650 |
| 3,985,913 | 10/1976 | Johnson | 426/98 |

FOREIGN PATENT DOCUMENTS 2222025  10/1974  France ......................... 426/638 X

*Primary Examiner*—Raymond N. Jones
*Assistant Examiner*—Elizabeth A. Hatcher
*Attorney, Agent, or Firm*—Oblon, Fisher, Spivak, McClelland & Maier

[57] ABSTRACT

An encapsulated foodstuff is prepared in a water-soluble and digestable capsule, which not only possesses seasoning properties, but also is nutritious. The capsule contains (a) a powdered water-extract of Chlorella algae, (b) garlic oil, powdered extract of garlic, powdered water-extracts of ginseng and/or American aloe, and (c) one or more vegetable oils.

6 Claims, No Drawings

ENCAPSULATED FOODSTUFF

BACKGROUND OF THE INVENTION

1. Field of the Invention

The present invention relates to improved, nourishing foodstuffs and to a process for the production of same.

More particularly, it concerns improved encapsulated foodstuffs and a process for the production of the same, which comprises mixing a water-extract of Chlorella algae with garlic, ginseng and/or American aloe, adding to the mixture one or more vegetable oils and encapsulating the resulting mixture.

2. Description of the Prior Art

It is, in general, believed that materials such as garlic, ginseng, American aloe and the like are effective in promotion of human health.

These materials, however, are not commonly used in the daily human diet since they impart strong disagreeable odors and flavors.

They have been, therefore, used only for very limited seasoning purposes.

In the past, there have been proposals to remove such undesirable smells and flavors from garlic, ginseng and/or American aloe, so that they might be reasonably utilized, however none of such proposals has ever been successful.

It is well known that Chlorella algae grows in water and belongs to the species of single cell algae.

In recent years it has been experimentally ascertained that the so-called Chlorella is rich in protein with high quality and contains the so-called Chlorella Growth Factor (in general abbreviated as C.G.F.) i.e., its contents are about 55% of protein, about 15% of fat, about 20% of carbohydrate, about 6% of minerals including unknown materials and about 4% of moisture. There have been various proposals to use Chlorella reasonably, not only for the purpose of preparing a nutritious diet stuff but also for the purpose of preparing a food additive. However, no proposal has been forthcoming since Chlorella, either in cell powder, or in water-extract, is difficult to deal with and to preserve reasonably.

It has not heretofore been considered to combine garlic, ginseng, American aloe and Chlorella together to obtain a single product.

SUMMARY OF THE INVENTION

According to the present invention, an improved extremely nutritious foodstuff is provided which does not impart a disagreeable odor or flavor. The foodstuff provided in accordance with the present invention, is composed of (a) Chlorella, (b) garlic, ginseng and/or American aloe and (c) one or more vegetable oils.

The foodstuff is encapsulated and it can not only be conveniently used as a seasoning but also can be accepted per se as a nutritious foodstuff without imparting the feeling of any undesirable strong nasty smell and disagreeable taste caused by its contents.

DETAILED DESCRIPTION OF THE PREFERRED EMBODIMENTS

The process by which the improved foodstuffs in encapsulated form are produced comprises mixing a water-extract of Chlorella algae with garlic extract, ginseng and/or American aloe, adding to the mixture one or more vegetable oils and encapsulating the result obtained in a capsule which is both water-soluble and digestable by humans.

An object of the present invention is to provide improved encapsulated foodstuffs composed of (a) Chlorella, (b) garlic, ginseng and/or American aloe and (c) one or more vegetable oils, which are useful not only as a seasoning, but also as a food additive.

Another object of the present invention is to provide improved encapsulated nourishing diet stuffs acceptable per se, which are composed of (a) Chlorella, (b) garlic, ginseng and/or American aloe, and (c) one or more vegetable oils, which do not impart any disagreeable odor of flavor caused by said contents.

The present invention has been conceived as the result of studies on the possibilities of handling Chlorella and reasonably preserving it in order to enable it to be employed as a foodstuff for the purposes of strengthening protein of foods, giving body to foods and accepting the same as a nourishing addition to the daily human diet, because of its composition of excellent protein, fat, minerals, etc.

In other studies aimed at the removal of the defects of Chlorella, there have been difficulties with a water-extract of Chlorella. It was difficult to deal with, difficult to transport, and could not be well preserved for a long period of time. It contained moisture and it was easily chemically and physically deteriorated. The present inventor has found that when the water-extract of Chlorella algae is freeze-dried into a powder, it may be reasonably dealt with, easily transported and effectively preserved for long periods of time without the occurrence of deterioration.

In further studies, the present inventor has found that when a powdered water-extract of Chlorella algae is mixed with extracts of the so-called Chinese foodstuffs, such as garlic, ginseng and/or American aloe, which have been believed to be nourishing, its preserving effect is further improved and together with this, the disagreeable odors and flavors of said Chinese foodstuffs are extremely decreased.

In further studies, the present inventor has found further that when the above mixture is admixed with one or more vegetable oils, the components of the above mixture may be well preserved because an oil layer is formed on the surface of the above mixture which prevents the aforesaid components from being contacted with an air and said nasty odors caused by Chinese foodstuffs are further decreased.

In additional studies, in order to enable the mixtures to be easily handled and preserved, the present inventor has found that when the mixture is encapsulated in a water-soluble and digestable capsule, this aim is attained.

The encapsulated products provided in accordance with the present invention are very useful not only as a food additive to season foods, but also as a daily nourishing diet supplement.

The encapsulated products are, when used as a seasoning, most effective when they are used in combination with other foods while being cooked, because the capsules are easily cleaved by the action of water and heat. Thus, the encapsulated materials are released during cooking and will spread into the foods which are therefore eventually seasoned.

The powdered water-extract of Chlorella algae which is used in the present invention is prepared by suspending about 1 kg of dried cells of Chlorella algae in about 10 kg of water, boiling it at about 100° C. until the total volume has been reduced by about one-third, filtering the product under pressure conditions and freeze-drying the filtrate to obtain a powder, wherein about 20 g of the powedered product will be obtained per about 1 kg of the filtrate.

The garlic, ginseng and/or American aloe, which are used in the present invention, are preferred to be in powdered form and can be prepared for example, as follows:

Powdered extracts of garlic are prepared by pressing the garlic to obtain a liquid, i.e., garlic oil, which is then freeze-dried, thereby obtaining powdered garlic.

Powdered extracts of ginseng and American aloe are first crushed into small particles which are dispersed in water, boiled at about 100° C., until the total volume has been reduced by one-fifth to one-tenth. The products are then filtered under pressure and the resulting filtrate is freeze-dried to obtain a powder.

The amount of water used is about ten times that of ginseng or American aloe.

The oils which are employed in the present invention are preferably vegetable oils, such as peanut oil, coconut oil, soybean lecithin and the like. However, peanut oil is the most preferable.

The mixing ratios of powdered water-extract of Chlorella algae, powdered extract of Chinese foodstuff and vegetable oil are, in general, respectively about 5 to 10 percent by weight, about 3 to 6 percent by weight, and about 60 to 70 percent by weight. The remainder may be other appropriate foodstuffs such as chemical seasonings, honey wax, vitamins or the like, in accordance with necessity and use.

The following tabulation represents the proportions of the ingredients in the working Examples 1 to 4 below relative to the amount of garlic oil, garlic extract, ginseng extract, or aloe extract.

| EXAMPLE | 1 | 2 | 3 | 4 |
| --- | --- | --- | --- | --- |
| Chlorella algae | 3.5 | 1.1 | 0.82 | 6.7 |
| garlic oil, garlic extract, ginseng extract, or aloe extract | 1 | 1 | 1 | 1 |
| Total Oil | 23.5 | 5.4 | 3.6 | 3.3 |

The Chlorella algae may therefore range from 0.67 to 3.5 times the amount of Chinese foodstuff and the oil from 3.3 to 23.5 times the amount of Chinese foodstuff.

The encapsulating capsule may be any commercially available capsule, so long as it is water-soluble and digestable in humans. The volume of the capsule is preferably about 270 to 300 mg.

Having generally described the invention, a more complete understanding can be obtained by reference to certain specific examples, which are included for purposes of illustration only and are not intended to be limiting unless otherwise specified.

EXAMPLE 1

35 mg of powdered water-extract of Chlorella algae was mixed with 6 mg of powdered water-extract of ginseng and 4 mg of garlic oil.

To the mixture 225 mg of peanut oil and 10 mg of soybean lecithin were added and then 200 mg of purified honey wax was added.

The product thus obtained was encapsulated in a capsule with a 300 mg volumetric capacity made from starch.

This encapsulated product was useful for seasoning a Chinese dish when it was applied thereto during its cooking. This encapsulated product was willingly taken as a nourishing diet stuff without giving any unnatural feeling.

EXAMPLE 2

45 mg of powdered water-extract of Chlorella algae was mixed with 25 mg of powdered water-extract of ginseng and 15 mg of powdered extract of garlic. To the mixture, 215 mg of peanut oil was added. The product thus obtained was encapsulated in a capsule with 300 mg volumetric capacity made from starch which is water-soluble and digestable.

This capsulated product could have been preserved for six months in a storeroom at room temperature without any change of the contents.

Thereafter, it was effective to season dishes, and it could also be taken as a nourishing diet without giving any unnatural feeling.

EXAMPLE 3

45 mg of powdered water-extract of Chlorella algae was mixed with 55 mg of powdered water-extract of ginseng. To the mixture 50 mg of coconut oil, 50 mg of soybean lecithin and 100 mg of peanut oil were added and the resulting product was shaken well so that the contents could be well-mixed. The product was then encapsulated in a capsule with a volumetric capacity of 300 mg.

This encapsulated product could be preserved at 30° C. for three months without any changes of the contents. Thereafter it was very effective to season a soup when cooked.

EXAMPLE 4

40 mg of powdered water-extract of Chlorella algae was mixed with 20 mg of garlic oil and 40 mg of powdered extract of garlic. To the mixture 80 mg of soybean lecithin and 120 mg of peanut oil were added and the resulting mixture was shaken well.

The product was encapsulated in a capsule with a volumetric capacity of 300 mg.

This encapsulated product could be preserved at 35° C. for eighty days without any change of the contents.

Thereafter it was very effective for seasoning meat dishes when cooked.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. An encapsulated foodstuff containing (a) a powdered freeze-dried water-extract of Chlorella algae, (b) at least one of garlic oil, powdered extract of garlic, powdered water extract of ginseng, and powdered water extract of aloe and (c) at least one vegetable oil, the encapsulating means being a water soluble digestible capsule into which is placed the foodstuff, the weight of component (a) being from 0.67 to 3.5 times the amount of component (b) and the weight of component (c) being from 3.3 to 23.5 times the weight of component (b) in the food-stuff.

2. The encapsulated foodstuff as claimed in claim 1, wherein said garlic oil is that which has been prepared by crushing garlics into small particles, compressing the small particles and filtering the resulting liquid.

3. The encapsulated foodstuff as claimed in claim 1, wherein said vegetable oil is peanut oil, coconut oil or soybean lecithin.

4. The encapsulated foodstuff as claimed in claim 1, wherein said powdered extract of garlic is that which has been prepared by crushing garlics into small particles, compressing the small particles, filtering the resulting liquid and freeze-drying the resulting filtrate.

5. An encapsulated foodstuff as claimed in claim 4, wherein said vegetable oil is peanut oil, coconut oil or soybean lecithin.

6. An encapsulated foodstuff which is prepared by mixing (a) 35 parts by weight of powdered water-extract of Chlorella algae prepared by suspending dry cells of Chlorella algae in water, boiling the suspension at about 100° C. until its total volume has been reduced by about one-third, filtering the resulting suspension under pressure and freeze-drying the filtrate, (b) 4 parts by weight of garlic oil, and (c) 6 parts by weight of powdered extract of ginseng prepared by crushing ginseng into fine particles, dispersing them in water, boiling the suspension at about 100° C. until its total volume has been reduced by one-fifth to one-tenth, filtering the suspension under pressure and freeze-drying the filtrate, and thereafter admixing (d) 225 parts by weight of peanut oil and (e) 10 parts by weight of soybean lecithin, and encapsulating the mixture in a water soluble digestible capsule.

* * * * *